(12) United States Patent
Gydesen

(10) Patent No.: US 10,218,154 B2
(45) Date of Patent: Feb. 26, 2019

(54) UNIT AND METHOD FOR CORONA TREATMENT

(71) Applicant: TRESU A/S, Bjert (DK)

(72) Inventor: Erik Gydesen, Vejle (DK)

(73) Assignee: TRESU A/S, Bjert (DK)

( * ) Notice: Subject to any disclaimer, the term of this patent is extended or adjusted under 35 U.S.C. 154(b) by 0 days.

(21) Appl. No.: 14/778,272

(22) PCT Filed: Mar. 18, 2014

(86) PCT No.: PCT/DK2014/050065
§ 371 (c)(1),
(2) Date: Sep. 18, 2015

(87) PCT Pub. No.: WO2014/146669
PCT Pub. Date: Sep. 25, 2014

(65) Prior Publication Data
US 2016/0056615 A1  Feb. 25, 2016

(30) Foreign Application Priority Data

Mar. 19, 2013  (DK) .................................. 2013 70159

(51) Int. Cl.
*B05D 3/14* (2006.01)
*H01T 19/00* (2006.01)
(Continued)

(52) U.S. Cl.
CPC ............. *H01T 19/00* (2013.01); *B05D 3/144* (2013.01); *B29C 59/10* (2013.01); *C01B 13/115* (2013.01);
(Continued)

(58) Field of Classification Search
USPC .......................... 118/620–640; 427/457–460; 250/324–326
See application file for complete search history.

(56) References Cited

U.S. PATENT DOCUMENTS 2,476,282 A * 7/1949 Castellan ................. D04H 1/54
                                                                118/620
3,369,981 A    2/1968 Levaux
(Continued)

FOREIGN PATENT DOCUMENTS

CN      2675387 Y    2/2005
DE      1504206 A1   2/1969
(Continued)

OTHER PUBLICATIONS

International Preliminary Report on Patentability completed May 13, 2015 in the corresponding PCT/DK2014/050065.
(Continued)

*Primary Examiner* — Yewebdar T Tadesse
(74) *Attorney, Agent, or Firm* — David S. Safran; Roberts Mlotkowski Safran Cole & Calderon, P.C.

(57) ABSTRACT

An apparatus for corona treatment, the apparatus including a corona treatment unit with an inlet side and an outlet side, wherein the unit includes one or more sets of transverse electrodes, at least one electrode in each set being connected to a high voltage source and at least one second electrode connected electrically to ground, wherein the second electrode connected to ground includes a rotatable roller. The apparatus is a through-flow apparatus adapted for corona treatment of material in sheets, and including at least one conveying table with a transverse direction and a longitudinal direction, where the at least one conveying table includes mechanical conveyor means. By such a solution is achieved an apparatus through which sheets of material can be conveyed and corona-treated without holding the material and pulling it through the apparatus.

6 Claims, 3 Drawing Sheets

(51) Int. Cl.
  *B29C 59/10* (2006.01)
  *C01B 13/11* (2006.01)
(52) U.S. Cl.
  CPC ...... *C01B 2201/22* (2013.01); *C01B 2201/62* (2013.01)

(56) References Cited

U.S. PATENT DOCUMENTS

| | | | |
|---|---|---|---|
| 4,060,382 | A | 11/1977 | Vertegaal |
| 6,290,823 | B1 | 9/2001 | Hyllberg et al. |
| 2012/0295036 | A1* | 11/2012 | Kulyk ................. D06M 10/025 427/535 |
| 2013/0250017 | A1* | 9/2013 | Saitoh ........................ C08J 7/00 347/101 |
| 2014/0320575 | A1* | 10/2014 | Kuypers ................. H01T 19/00 347/111 |

FOREIGN PATENT DOCUMENTS

| | | | |
|---|---|---|---|
| DE | 19508933 | A1 | 9/1996 |
| EP | 1757450 | A | 2/2007 |
| GB | 1377490 | A | 12/1974 |
| GB | 1 504 247 | A | 3/1978 |
| JP | 2001-293363 | A | 10/2001 |
| JP | 2002-307820 | A | 10/2002 |
| JP | 2003-007499 | A | 1/2003 |
| JP | 2003-260319 | A | 9/2003 |
| JP | 2004-042628 | A | 2/2004 |
| JP | 2006-076202 | A | 3/2006 |
| JP | 2009-504938 | A | 2/2009 |
| JP | 19508933 | A | 4/2012 |
| WO | 2012/048228 | A1 | 4/2012 |
| WO | 2013104753 | A2 | 7/2013 |

OTHER PUBLICATIONS

Teknik Print (MY) 6300274—Stykliste for TOU3(DS)118 H.PN. sheet treater.dwg—Admitted Prior Art.
Teknik Print (MY) DSCN3028JPG—Admitted Prior Art.
Teknik Print (MY) DSCN3032.JPG—Admitted Prior Art.
Teknik Print (MY) Faktura.doc—Admitted Prior Art.
Teknik Print (MY) OI 28123.xls—Admitted Prior Art.
Teknik Print (MY) Teknik Print _MY_ Offer 050111 OP CPIC 2.pdf—Admitted Prior Art.
Teknik Print (MY) Teknik Print orderconfirmation.jpg—Admitted Prior Art.
Teknik Print (MY) Teknik Print proforma invoice.jpg—Admitted Prior Art.
1986.pdf—Admitted Prior Art.
MASKINTEGNING AF Vetaphone Corona-Plus, NILPETER P3/P4 TOU(C4)040,TEGNINGSNR. 3044727, AF 29.02.2000—Admitted Prior Art.
Foto AF Vetaphone Elektronik's Stand Fra Expo Messen I Bruxelles I 2001, Visende Et Vetaphone Corona-Plus Apparat—Admitted Prior Art.
Youtube Video Fra Vetaphone (https://www.youtube.com/watch?v=yWJE-Z6BBWc), uploadet Nov. 29, 2010—Admitted Prior Art.
Youtube Video Fra Vetaphone (https://www.youtube.com/watch?v=C7wpkSCaDXa), uploadet Sep. 9, 2011—Admitted Prior Art.
Forklaringsdokument til omprovningssagen fra begaerer, vedlagt nedenstaende bilag; Explanation document to omprovningssagen from claiming, together following sequence of Annex—Admitted Prior Art.
Shanghai EELY-ECW (CN) 2344506—Oversigts tegning TOU3 DS H.PN Sheet treater.dwg.—Admitted Prior Art.
Shanghai EELY-ECW (CN) 3045161-TOU3(DS)XXX H-PN sheet treater (oplaeg).dwg. Admitted Prior Art.
Shanghai EELY-ECW (CN) 3045161-TOU3(DS)XXX H-PN sheet treat.dwg.—Admitted Prior Art.
Shanghai EELY-ECW (CN) 3434744-Underlagsplade for hojde justering sheet treater.dwg—Admitted Prior Art.
Shanghai EELY-ECW (CN) 6205969—Cable Drawing.dwg—Admitted Prior Art.
Shanghai EELY-ECW (CN) 6214709—Regulering for valse TOU3 sheet treater.dwg Admitted Prior Art.
Shanghai EELY-ECW (CN) 6300296—Stykliste for TOU3(DS)XXX H.Pn.sheet treater.dwg—Admitted Prior Art.
Shanghai EELY-ECW (CN)—6310164—Pneudiagram.dwg—Admitted Prior Art.
Shanghai EELY-ECW (CN) 7009076-o50 Ledevalse m.o20 stag TOU3 sheet treater.dwg—Admitted Prior Art.
Shanghai EELY-ECW (CN) 7009077-o50 Ledevalse m.o20 stag for regul.TOU3 sheet treater.dwg—Admitted Prior Art.
Shanghai EELY-ECW (CN) 7015076-o98 Valse med o25 stag.dwg—Admitted Prior Art.
Shanghai EELY-ECW (CN) 7476076-DS-elektrode for 100×100 ror TOU3 076 sheet treater.dwg—Admitted Prior Art.
Shanghai EELY-ECW (CN) 7653076—o48 Valse m. o20 shaft TOU3 076.dwg—Admitted Prior Art.
Shanghai EELY-ECW (CN) DSCN3566.jpg—Admitted Prior Art.
Shanghai EELY-ECW (CN) DSCN3567.jpg—Admitted Prior Art.
Shanghai EELY-ECW (CN) DSCN3568.jpg—Admitted Prior Art.
Shanghai EELY-ECW (CN) DSCN3569.jpg—Admitted Prior Art.
Shanghai EELY-ECW (CN) DSCN3570.jpg—Admitted Prior Art.
Shanghai EELY-ECW (CN) DSCN3571.jpg—Admitted Prior Art.
Shanghai EELY-ECW (CN) DSCN3572.jpg—Admitted Prior Art.
Shanghai EELY-ECW (CN) DSCN3573.jpg—Admitted Prior Art.
Shanghai EELY-ECW (CN) DSCN3574.jpg—Admitted Prior Art.
Shanghai EELY-ECW (CN) DSCN3575.jpg—Admitted Prior Art.
Shanghai EELY-ECW (CN) DSCN3576.jpg—Admitted Prior Art.
Shanghai EELY-ECW (CN) DSCN3577.jpg—Admitted Prior Art.
Shanghai EELY-ECW (CN) Faktura.doc—Admitted Prior Art.
Shanghai EELY-ECW (CN) Fwd Shanghai EELY.msg—Admitted Prior Art.
Shanghai EELY-ECW (CN) Invoice overdue.pdf—Admitted Prior Art.
Shanghai EELY-ECW (CN) OI29340.xls—Admitted Prior Art.
Shanghai EELY-ECW (CN) Rentefaktura.pdf—Admitted Prior Art.
3044727-TOU4(C4)040 (29-02-2000).jpg—Admitted Prior Art.
Label Expo 2001.jpg—Admitted Prior Art.
Electronics Circuit World Co. (HK) Packing List.doc—Admitted Prior Art.
Electronics Circuit World Co. (HK) 0129420.xls—Admitted Prior Art.
Electronics Circuit World Co. (HK) Faktura.doc—Admitted Prior Art.
Electronics Circuit World Co. (HK) DSCN3693.JPG—Admitted Prior Art.
Electronics Circuit World Co. (HK) DSCN3691.JPG—Admitted Prior Art.
Electronics Circuit World Co. (HK) DSCN3689.JPG—Admitted Prior Art.
Electronics Circuit World Co. (HK) 6300296-Stykliste for TOU3(DS)XXX H.PN.sheet treater.dwg—Admitted Prior Art.
Electronics Circuit World Co. (HK) 6205983—Cable Drawing.dwg—Admitted Prior Art.
Electronics Circuit World Co. (HK) 3045161-TOU3(DS)XXX H-PN sheet treater.dwg—Admitted Prior Art.
Electronics Circuit World Co. (HK) 2344506—Oversigts tegning TOU3 DS H.PN Sheet treater.dwg—Admitted Prior Art.
Teknik Print (MY) 2344442—Oversigts tegning TOU3 H.PN Sheet treater.dwg—Admitted Prior Art.
Teknik Print (MY) 3045161-TOU3(DS)118 H-PN sheet treater.dwg—Admitted Prior Art.
Teknik Print (MY) 6205921—Cable Drawing.dwg—Admitted Prior Art.

* cited by examiner

UNIT AND METHOD FOR CORONA TREATMENT

BACKGROUND OF THE INVENTION

Field of the Invention

The present invention concerns an apparatus for corona treatment, the apparatus including a corona treatment unit with an inlet side and an outlet side, wherein the unit includes one or more sets of transverse electrodes, at least one electrode in each set being connected to a high voltage source and at least one second electrode connected electrically to ground, wherein the second electrode connected to ground includes a rotatable roller. The invention furthermore concerns use of an apparatus for corona treatment.

Description of Related Art

It is commonly known that on web materials of some type of polymer, or on materials with a coating or at least with a component part of a polymer material, a corona treatment is performed on these webs of material. Such machines are typically adapted with a number of rollers by which one or more operations are performed. One of these operations can be corona treatment where the web material is passed over a roller which is electrically connected to ground, and where at the other side of the web material and close to the roller there is arranged an electrode, e.g., a ceramic electrode, which is connected to a high voltage source. Between the electrode and the roller is generated a corona in the form of an electric arc through which the web material is passed and thereby subjected to the actual corona treatment. The corona treatment causes oxidation of the surface of the web material and is performed so as to adapt the surface tension on the material in order thereby to achieve an increased absorption and/or adherence capability.

For example, by making plastic films by extrusion or similar, a corona treatment of the web material is frequently performed before being rolled up. Also, when using printing machines, in connection with making prints or application of lacquer on webs of material, corona treatment is often used whereby the quality of the printing and/or lacquering is considerably improved due to a distinctly better adherence.

When applying corona treatment, the material is brought in between the ground connected roller and the high voltage connected electrode which together typically form a narrow gap, typically about 1 to 3 mm, and obviously with a spacing that is at least slightly greater than the thickness of the object that is corona treated.

By the corona treatment process there is, as mentioned, developed an electric arc—a discharge of energy—and the discharge of energy causes oxygen to react with the surface of the material, generating ozone as a by-product why exhaustion is required in connection with corona treatment. The exhaustion furthermore has the effect that the air sucked in from the surroundings will cool the corona electrodes which operate best at not too high temperatures, and which also can be damaged at a too high temperature. Moreover, the flowing air and thereby the cooling effect can be an active part of a system for preventing fire in possible stowed material to be corona treated.

As mentioned, it is commonly known to perform corona treatment on web material, but when it comes to material which is not in webs but, e.g., in sheets, more manually accentuated methods are applied. This can, e.g., be in the form of a corona field formed between a stationary electrode and a stationary ground connected part. A corona treatment typically requires that the material is moved manually into and out of the field and then subjected to the subsequent operations necessitating the corona treatment.

Until now no automated method for corona treatment of material in sheets has thus been indicated as particularly the exhaustion from a corona treatment facility has appeared to be a challenge since the material is influenced by the airflow from the exhaust which hitherto has been performed by exhausting over the said stationary electrodes.

SUMMARY OF THE INVENTION

It is the object of the invention to indicate a solution by which a corona treatment can be performed in connection with printing and/or lacquering, where a good corona treatment as well as a sufficient exhaustion and cooling of one or more corona electrodes are achieved simultaneously with the material being capable of being moved mechanically through a corona treatment apparatus.

As mentioned in the introduction and as indicated herein, the invention concerns an apparatus for corona treatment, the apparatus including a corona treatment unit with an inlet side and an outlet side, wherein the unit includes one or more sets of transverse electrodes, at least one electrode in each set being connected to a high voltage source and at least one second electrode connected electrically to ground, wherein the second electrode connected to ground includes a rotatable roller.

The new feature of an apparatus for corona treatment is that the apparatus is a through-flow apparatus adapted for corona treatment of material in sheets, and including at least one conveying table with a transverse direction and a longitudinal direction, where the at least one conveying table includes mechanical conveyor means, e.g., a series of rotatable transverse rollers, a conveyor belt or other form of conveying means, wherein these mechanical conveying means are arranged at at least an inlet side and/or an outlet side in relation to the corona treatment unit, where the corona treatment unit includes at least one transverse roller electrically connected to ground and arranged with a spacing, e.g., a spacing between 0.5 and 15 mm, from the outer periphery to the nearest surface of a first electrode, where the apparatus is adapted for forming a corona between the first electrode and the transverse roller, where the periphery on the at least one transverse roller is arranged substantially at the same level as the surface of the mechanical conveying means.

By such a solution is achieved an apparatus through which sheets of material can be conveyed and corona-treated without holding the material and pulling it through the apparatus. The material thus rests on a base, e.g., a conveyor belt, and is moved by this through the corona treatment apparatus. The corona discharge occurs between a first electrode connected to a high voltage source and a second electrode connected to ground. The first electrode may advantageously be stationary and with a ceramic coating whereas the second electrode which can be in the form of a roller is then rotatable about its longitudinal axis. As mentioned, there is a gap between the electrodes which advantageously can have an approximate size of, e.g., 4 mm, 3 mm, 2.5 mm, 2 mm, 1.8 mm, 1.6 mm, 1.4 mm or even less. The size of the gap is adapted to the specific design of respective electrodes, the voltage and amperage of the high voltage and possibly according to several other parameters.

In an embodiment of an apparatus for corona treatment, there may be arranged one, two, three or more sets of electrodes in succession such that a sheet to be corona treated passes between all these sets of electrodes, whereby a more even distribution of the corona treatment is achieved as the same time as the conveying speed of the material can be increased, without influencing the quality of the corona treatment.

An apparatus for corona treatment according to the invention may advantageously include a replaceable cassette with two, three or more transverse electrodes, where each of the electrodes is connected to a high voltage. Such a cassette can, e.g., be adapted with means in the form of a rail system that interacts with other means/rails on the apparatus such that a cassette in principle acts as drawer which can be pulled out from and pushed into the apparatus itself. Hereby, it will be easy to replace one or more electrodes for service or for other reasons. Such a cassette can include coupling means for connection to the said high voltage. Hereby, is achieved that respective electrodes in a cassette are coupled and connected to high voltage in a very simple and rapid way as connection is created just by disposing the cassette in the intended position. For example, there may be coupling means in the form of an electric plug/socket which is connected/interrupted by, e.g., the last 10 mm of displacement of the cassette in the rail system.

In a variant of an apparatus for corona treatment according to the invention, the apparatus may include a transverse, ground connected electrode/roller for each of the first transverse electrodes. Ample spreading of the corona is achieved hereby, and hence a good result of the treatment.

In a variant of the invention there may, e.g., be arranged three stationary electrodes in parallel per cassette, and there may be arranged one aluminum roller/electrode per stationary electrode. Other variants with one, two or more than three sets of electrodes are possible as well.

An apparatus for corona treatment according to the invention includes in an embodiment at least one suction box arranged around one or more of the transverse electrodes/rollers that are electrically connected to ground, where the suction box includes connection means for connecting a suction device. In this way exhaustion is established under the conveyed sheets. In the prior art apparatuses used for web material where the material lies tightly onto a roller, suction is performed from above. Air is hereby sucked in above the material, which is only possible with a retained material. In the present situation where the material, which is in sheets, is held, this will cause the sheets to be sucked off the table and up against the electrodes. This problem is solved by reversing the airflow, so to say, such that suction is performed under the material and not above it.

By reversing the suction process such that suction is performed in the opposite direction as opposed to previously, a quite perfect situation is achieved where the loose sheets in a way are fixed to the base which here is constituted by the rotating rollers acting as electrodes, and at the same time, stationary electrodes as well as movable electrodes are cooled, and the ozone formed in connection with the corona treatment is securely exhausted.

A kind of suction box is therefore established under the rollers, the box substantially fitting tightly up under the rollers such that sucking occurs only or substantially in gaps along the rollers. When a sheet of material covers such gaps, a vacuum is built up under the sheet providing that the sheet is retained in the desired position. However, it is obvious that too strong vacuum will cause the material to be held back which is not the intention, of course, why the applied suction is adjusted to the actual conditions.

An apparatus for corona treatment according to the invention may include two or more transverse rollers, where a supporting surface is arranged at one or both sides of a transverse roller, where between one or two rollers and a supporting surface there is formed a narrow gap for passage of sucked-in air. By arranging such a support face there is achieved the advantage that a conveyed sheet cannot be sucked down between the two rollers as the support face simply forms a base upon which the sheets in some cases rest between two rollers or in front of or after a roller. By one or more of such support faces between two or more rollers it is possible to have given spacing between two adjacent rollers whereby an optimal distribution of corona can be achieved while at the same time slots for the exhausted air are formed. Such support surfaces can furthermore be connected to ground and may be used as electrodes that interact with other electrodes arranged over these support faces.

In a variant of an apparatus for corona treatment according to the invention, the apparatus may include a screen around the first electrodes (the stationary electrodes), where in the screen there is arranged one or more apertures for intake of air. Via these apertures air is sucked in—indirectly—due to the suction performed under the previously mentioned rollers. The disposition and the size of such apertures can advantageously be chosen such that the air is guided past the electrodes in an advantageous way whereby an optimized cooling of the electrodes is achieved. In a variant of such a screen there may be arranged one or more apertures extending substantially along the electrode or electrodes arranged under the screen. The aperture or apertures can be arranged with means for regulating the size of one or more apertures. In their simplest form, these regulating means can be a form of sliding damper that may be opened more or less whereby a larger or smaller area is free to supply air to the process of cooling electrodes and for carrying away the ozone generated during the corona treatment.

An apparatus for corona treatment according to the invention may further include a screen around the first electrodes, where internally of the screen there is arranged one or more guide plates/partitionings. These guide plates/partitionings internally of the screen cause the sucked in air to be guided in direction e.g., of a certain electrode whereby cooling and airflow in general can be controlled. One or more guide plates can be arranged with adjusting means that enable different positions and thereby different effects.

An apparatus for corona treatment according to the invention may advantageously include one or more sensors adapted for detecting passage of material/sheets, and where the sensor or sensors is/are connected to control means for interruption of high voltage for the first electrodes. By one or more such sensors it is possible to optimize the time in which energy is supplied to one or more electrodes, whereby energy is saved. At the same time is achieved the great advantage that no ozone is generated which in principle is an unwanted by-product in performing corona treatment. Such a sensor can, e.g., be a movement sensor detecting whether products in the form of material in sheets is conveyed or not. If no products are detected within a given time, interruption of the high voltage to the electrodes can be effected or the corona treatment process can be discontinued in other ways. Also, a switching off of the conveying means advancing material in the apparatus can be effected.

Sensors can also be adapted to switch off the unit in the case that material is conveyed into the apparatus, but not out of it. If this occurs, it can mean accumulation of material inside the corona treatment unit itself, implying a risk of fire.

Irrespective what and how much one or more of such sensors are adapted to control and interrupt, it is effected in order to save energy for reducing discharge of ozone to the surrounding and to ensure that superheating and possibly fire do not occur.

In an embodiment of an apparatus for corona treatment according to the invention, the apparatus may include adjusting means for adjusting the distance between a first electrode and a second electrode/transverse roller. In order to adjust the distance between a stationary electrode and an underlying roller, it is possible to adapt the apparatus to perform an optimal corona treatment on products/material/sheets with different thicknesses as the distance is adapted to the specific items to be treated. The distance can be adjusted manually by acting on, e.g., one or more spindles with screw thread, an operation which can take place in an automated way as well by operating one or more electric actuators.

The invention furthermore includes use of an apparatus for corona treatment according to the invention as described above, wherein the corona treatment is performed on material in sheets, e.g., sheets on which ink and/or lacquer has been or is to be applied, where the material in sheets is conveyed mechanically from an inlet side towards an outlet side and on the way passes between one or more electrodes connected to a high voltage and one or more ground connected transverse electrodes/rollers. Compared with the prior art methods for continuous corona treatment of items, this use differs by being treatment of material in separate sheets, and therefore not a web-shaped material which is conveyed in a long web between, e.g., two rollers.

A peculiar particular feature of the invention is suction from a position under the material, but also under the surface on which the material is conveyed. In all previously known corona treatment facilities, suction over the material occurs in such a way that the air sucked away is substituted by air sucked in immediately over the material. According to the invention, air is sucked in over the electrodes and conducted past the latter, down between respective products that are corona treated, and then exhausted. The suction is hereby used for fixing and holding the product on the base.

The invention is described in the following with reference to the accompanying drawings.

DETAILED DESCRIPTION OF THE INVENTION

Figure 1:
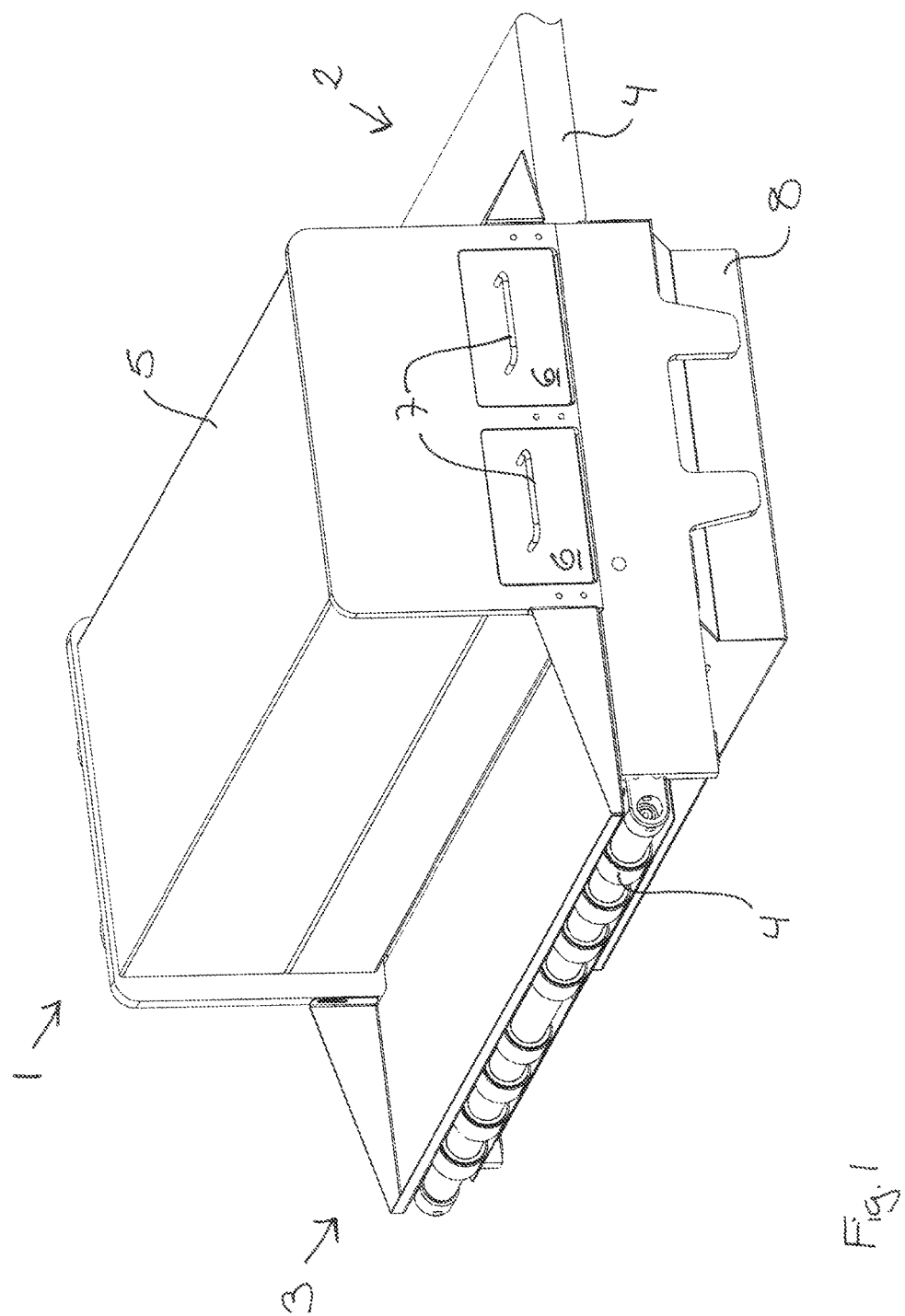
FIG. 1 shows a corona treatment unit.

In the explanation of the figures, identical or corresponding elements will be provided with the same designations in different figures. Therefore, an explanation of all details will not necessarily be given in connection with each single figure/embodiment. In FIG. 1 is seen a corona treatment unit 1 which includes an inlet side 2 and an outlet side 3. The material to be corona treated is conveyed from the inlet side 2 via a conveyor table 4 into the central part of the corona treatment unit 1 and exits at the outlet side 3. The central part of the corona treatment unit 1 here appears with a screen 5 in which is arranged two cassettes 6, each with a handle 7 and further including a suction box 8. These parts will be described in more detail below. The corona treatment unit 1 is thus in the shown variant an assembled unit which readily can be arranged in continuation of or in front of machines and other equipment, for, e.g., printing, lacquering, drying and the like.

Figure 2:
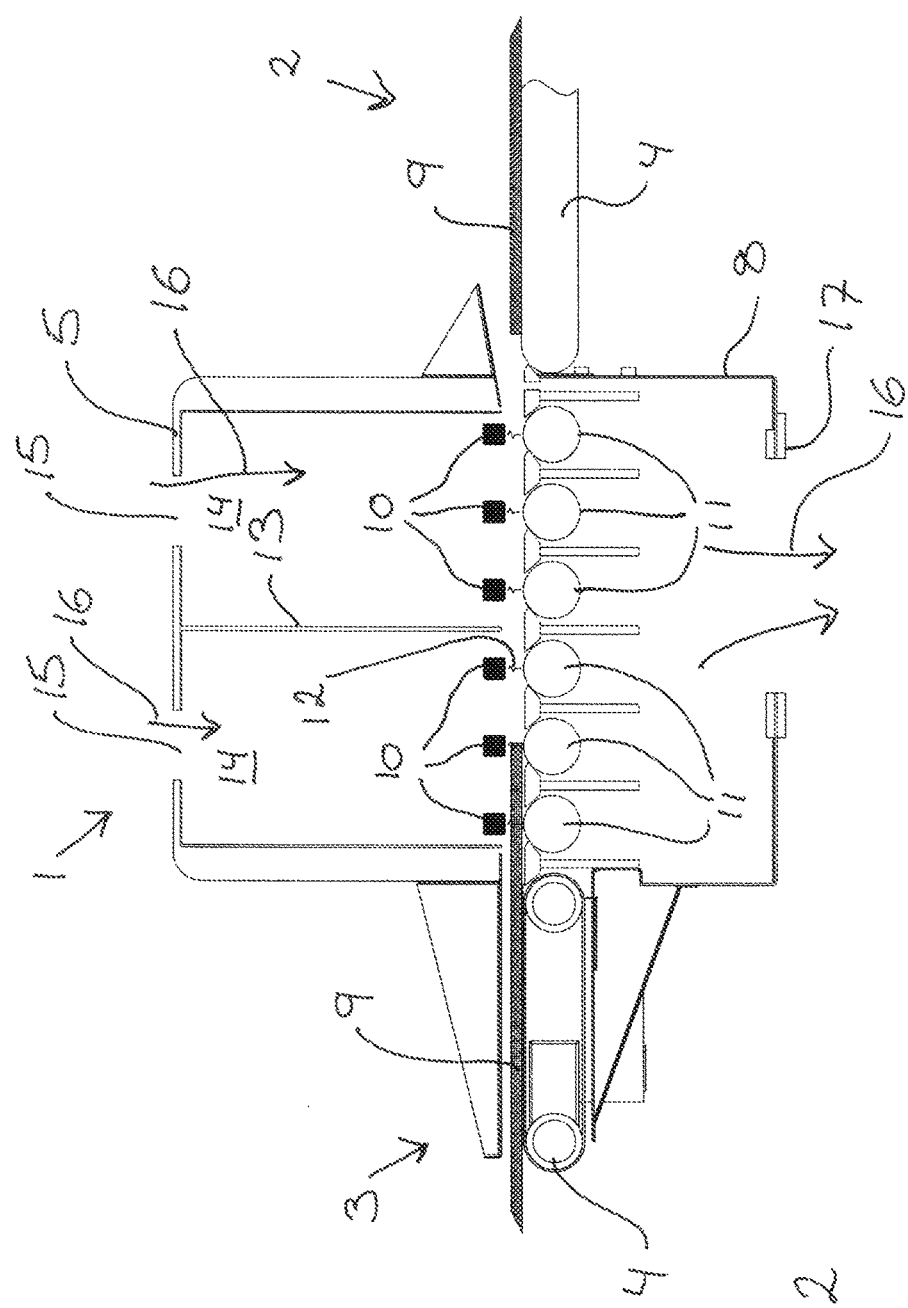
FIG. 2 shows a cross-section of a corona treatment unit.

FIG. 2 shows a corona treatment unit 1 which, as also shown in FIG. 1, but here in longitudinal section, thus showing a cross-section of the corona treatment unit 1. In this figure, is also seen the inlet side 2 and the outlet side 3 at opposite sides of the central part of the corona treatment unit 1 with the screen 5 over the conveying table 4 and with the suction box 8 under the conveying table 4. On the mentioned conveying table 4, are shown two sheets of material 9 which are passed under six transverse first electrodes 10 via the conveying table 4 and thereby over the six transverse second electrodes 11 which are here in the form of rollers. These rollers are connected to drive means (not shown) such that the material 9 is also advanced irrespectively of the material not having any direct contact with the inlet side 2 and/or the outlet side 3 of the conveying table. Between a set of a transverse first electrode 10 and a transverse second electrode 11 a zigzag line is shown that symbolizes a corona discharge 12.

The screen 5 has internally a partitioning 13 dividing the screen 5 into two transverse chambers 14, each provided with an aperture 15 for intake of air. These apertures 15 are adjustable in size/area as regulating means that can be adjusted according to specific need. The transverse first electrodes 10 are arranged in groups with three electrodes 10, wherein such group of electrodes 10 is arranged in a cassette 6, as shown in FIG. 1. By means of a handle 7, such a cassette 6 can be pulled out of its seat in the screen 5 for servicing, maintenance or replacement. At the same time, a cassette 6 and the screen 5 may be arranged such that a cassette 6 can be arranged at different heights above the underlying electrodes/rollers 11. The partitioning 13 serves the purpose of facilitating the checking and controlling of the airflow 16 through the screen and around respective electrodes 10, and further down into the suction box 8 that encloses the lower part of the corona treatment unit 1. The six rollers 11 appear in the suction box 8, each roller 11 interacting with a respective electrode 10. Furthermore, in the suction box 8 is seen connecting means 17 for connection to a exhaust device (not shown). By sucking at the bottom of the suction box 8, a uniform flow of air 16 between electrodes 10 and rollers 11 is achieved, whereby uniform cooling of these parts is attained.

Figure 3:
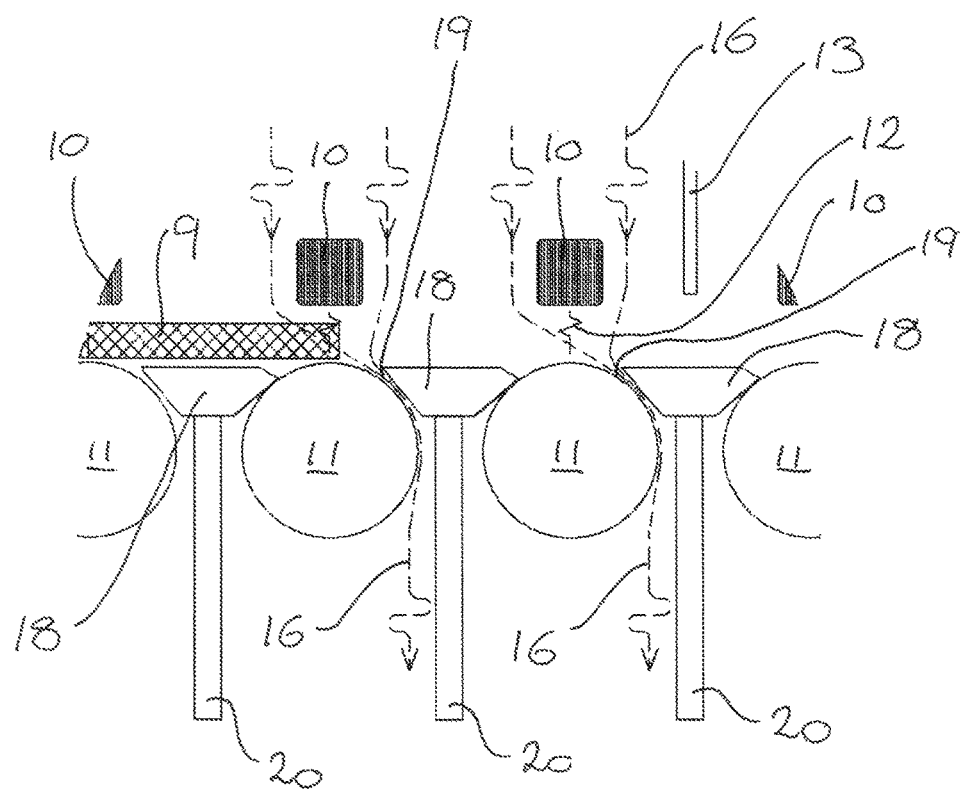
FIG. 3 shows details of electrodes and conveying means in a corona treatment unit.

Finally, FIG. 3 shows a detail of a corona treatment unit 11 wherein four sets of first and second transverse electrodes 10, 11 and a sheet of material 9 on the way to the outlet side 3 are seen fully or partially. Between respective electrodes 10, 11 appears a corona discharge 12, and the airflow 16 between the electrodes 10, 11 is represented by arrows. Between two adjacent electrodes/rollers 11 is seen a support surface 18 adapted such that a material sheet 9 can pass over the rollers 11 without being sucked down between two rollers 11. Between a support surface 18 and a roller 11 there is a very small gap 19. This gap 19 ensures that the air is sucked out close to the roller, thereby achieving optimal removal of heat as the rollers 11, so to say, are swept by an optimized amount of air mixed with the ozone which is formed by the corona discharge 12 between the electrodes 10, 11 and thereby on the material 9. Under the support surfaces 18 there are arranged a type of separating and carrying surfaces 20 which assist in controlling the airflow 16 and also assist in propping up the mentioned support surfaces 18.

What is claimed is:

1. An apparatus for corona treatment, the apparatus including a corona treatment unit with an inlet side and an outlet side at opposite sides of a central part of the corona treatment unit, wherein the corona treatment unit includes at least one set of transverse electrodes, at least one electrode in each set being connected to a high voltage source and at least one second electrode connected electrically to ground, wherein the second electrode connected to ground, includes at least two rotatable transverse rollers, wherein the apparatus is a through-flow apparatus adapted for corona treatment of material in sheets, and including at least one conveying table with a transverse direction and a longitudinal direction, where the at least one conveying table includes mechanical conveyor means, wherein these mechanical conveying means are arranged at at least one of said inlet side and said outlet side of the corona treatment unit, where the at least two transverse rollers of the at least one set of transverse electrodes is electrically connected to ground, and arranged with a spacing, from the outer periphery to the nearest surface of a first electrode, where the apparatus is adapted for forming a corona between the first electrode, wherein the apparatus includes at least one suction box arranged under the conveying table around at least one transverse electrode formed by the at least two rotatable transverse rollers, where the electrode is electrically connected to ground, and where the suction box includes connection means for connecting a suction device below the conveying table so that suction is performed under the sheets and the at least two rotatable transverse rollers, a screen arranged around the first electrodes sucked-in air being drawn downwardly through the screen, through a gap formed between each of the at least two rotatable transverse rollers and a supporting surface arranged between the at least two rotatable transverse rollers, to and through the suction box, where the periphery on the at least two rotatable transverse rollers is arranged substantially at the same level as the surface of the mechanical conveying means; wherein the apparatus includes a replaceable cassette with at least two transverse electrodes of the at least one set of transverse electrodes, where each of the electrodes is connected to a high voltage.

2. Apparatus for corona treatment according to claim 1, wherein the apparatus includes a respective one of the transverse, ground, connected electrodes is provided for each of the first transverse electrodes, where the ground, connected electrode is formed by a respective one of the at least two rotatable transverse rollers.

3. An apparatus for corona treatment, the apparatus including a corona treatment unit with an inlet side and an outlet side, wherein the unit includes at least one set of transverse electrodes, at least one electrode in each set being connected to a high voltage source and at least one second electrode connected electrically to ground, wherein the second electrode connected to ground, includes at least one rotatable transverse roller, wherein the apparatus is a through-flow apparatus adapted for corona treatment of material in sheets, and including at least one conveying table with a transverse direction and a longitudinal direction, where the at least one conveying table includes mechanical conveyor means, wherein these mechanical conveying means are arranged at at least one of an inlet side and an outlet side in relation to the corona treatment unit, where the corona treatment unit includes the at least one at least one transverse roller electrically connected to ground, and arranged with a spacing, from the outer periphery to the nearest surface of a first electrode, where the apparatus is adapted for forming a corona between the first electrode, and the at least one rotatable transverse roller, where the periphery on the at least one at least one transverse roller is arranged substantially at the same level as the surface of the mechanical conveying means, where the apparatus includes at least two rotatable transverse rollers, where a supporting surface is arranged at at least one side of the at least two rotatable transverse rollers, where between at least one of the at least two rotatable transverse rollers and the supporting surface is formed a gap for passage of sucked-in air, wherein the apparatus includes a screen around the first electrodes, where internally of the screen there is arranged at least one plate.

4. Apparatus for corona treatment according to claim 3, wherein at least one aperture for intake of air is arranged in the screen around the first electrodes.

5. An apparatus for corona treatment, the apparatus including a corona treatment unit with an inlet side and an outlet side, wherein the corona treatment unit includes at least one set of transverse electrodes, at least one electrode in each set being connected to a high voltage source and at least one second electrode connected electrically to ground, wherein the second electrode connected to ground, includes at least one rotatable transverse roller, wherein the apparatus is a through-flow apparatus adapted for corona treatment of material in sheets, and including at least one conveying table with a transverse direction and a longitudinal direction, where the at least one conveying table includes mechanical conveyor means, wherein these mechanical conveying means are arranged at at least one of an inlet side and an outlet side in relation to the corona treatment unit, where the corona treatment unit includes the at least one at least one transverse roller electrically connected to ground, and arranged with a spacing, from the outer periphery to the nearest surface of a first electrode, where the apparatus is adapted for forming a corona between the first electrode, and the at least one rotatable transverse roller, where the periphery on the at least one at least one transverse roller is arranged substantially at the same level as the surface of the mechanical conveying means, where the apparatus includes at least two rotatable transverse rollers, where a supporting surface is arranged at at least one side of the at least two rotatable transverse rollers, where between at least one of the at least two rotatable transverse rollers and the supporting surface is formed a gap for passage of sucked-in air, and wherein the apparatus includes at least one sensor adapted for detecting passage of sheets, and where the at least one sensor is connected to control means for interruption of high voltage for the first electrodes.

6. An apparatus for corona treatment, the apparatus including a corona treatment unit with an inlet side and an outlet side, wherein the corona treatment unit includes at least one set of transverse electrodes, at least one electrode in each set being connected to a high voltage source and at least one second electrode connected electrically to ground includes at least one rotatable transverse roller, wherein the apparatus is a through-flow apparatus adapted for corona treatment of material in sheets, and including at least one conveying table with a transverse direction and a longitudinal direction, where the at least one conveying table includes mechanical conveyor means, wherein these mechanical conveying means are arranged at at least one of an inlet side and an outlet side in relation to the corona treatment unit, where the corona treatment unit includes the at least one at least one transverse roller electrically connected to ground, and arranged with a spacing, from the outer periphery to the nearest surface of a first electrode, where the apparatus is adapted for forming a corona between the first electrode, and the at least one rotatable transverse roller, where the periphery on the at least one at least one transverse roller is arranged substantially at the same level as the surface of the mechanical conveying means, where the apparatus includes at least two rotatable transverse rollers, where a supporting surface is arranged at at least one side of the at least two rotatable transverse rollers, where between at least one of the at least two rotatable transverse rollers and the supporting surface is formed a gap for passage of sucked-in air, and wherein the apparatus includes adjusting means for adjusting the distance between each of the first electrodes and a respective one of the transverse electrodes.

* * * * *